United States Patent Office 3,398,036
Patented Aug. 20, 1968

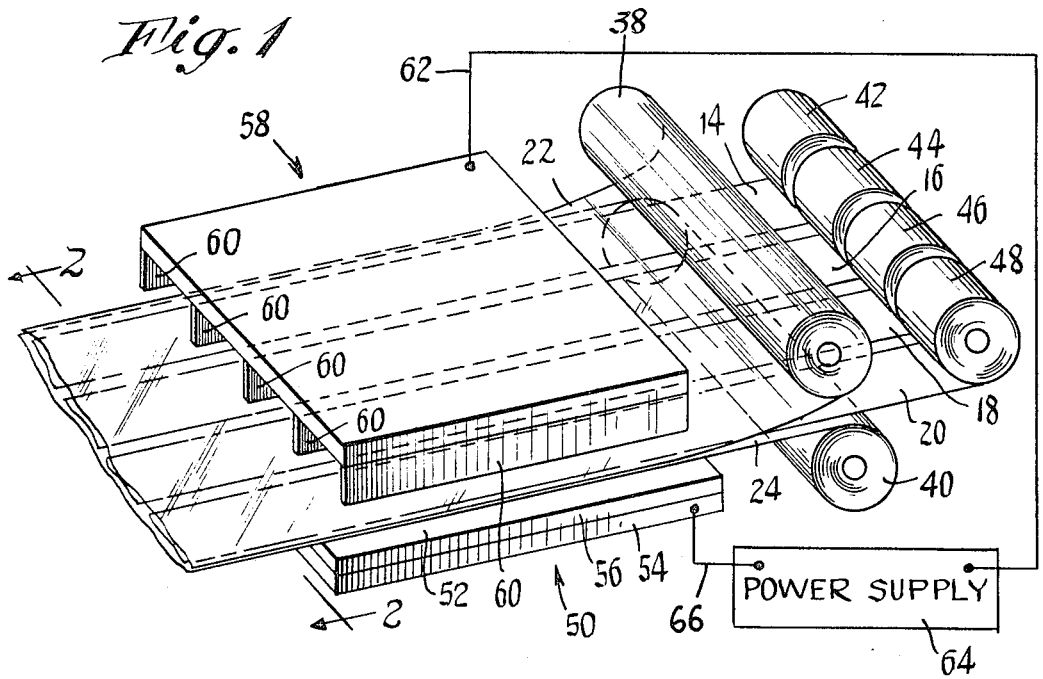
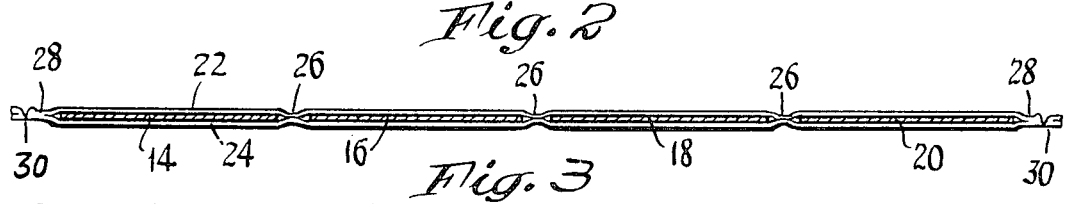
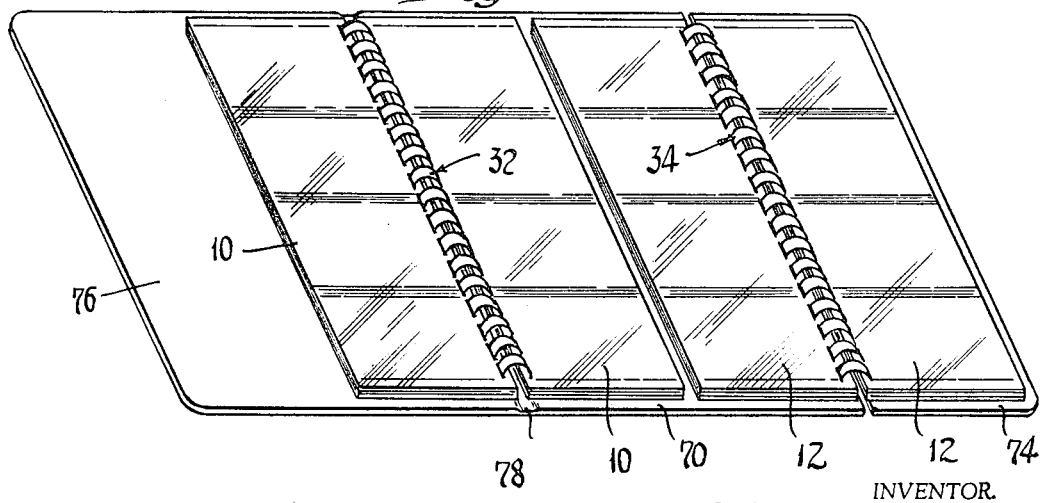

3,398,036
PROCESS OF MAKING SHEETS FOR PHOTO
ALBUMS OR THE LIKE
Eric A. Viesturs, 14 Cottage St.,
East Norwalk, Conn. 06855
Original application May 17, 1966, Ser. No. 550,673.
Divided and this application June 5, 1967, Ser. No.
643,696
5 Claims. (Cl. 156—267)

ABSTRACT OF THE DISCLOSURE

A continuous production method of making filler leaves for an album, book or the like, which includes the process of simultaneously feeding two superposed heat-sealable plastic sheets and a plurality of interposed edge-to-edge but spaced, parallel filler webs, all as a flat assemblage, to a sealing station, and at said station heat sealing the plastic sheets together along straight lines not only at the side edges of the sheets but also at locations inward of said side edges, between the filler webs.

---

This application is a division of my copending application Ser. No. 550, 673, filed May 17, 1966, now abandoned and entitled, "Photo Album or the Like and Process of Making Sheets for Same."

This invention relates to photo albums and similar structures, and more particularly to a method for making filler sheets or leaves for the same.

Objects of the invention are to provide an improved method of producing pocket or envelope type filler sheets for albums and the like, which utilizes high production techniques and preassembly procedures to reduce the fabrication costs while providing an improved product; to provide an improved method for producing said filler sheets, which is simple, easily carried out with relatively little equipment, and reliable and foolproof in its procedures; to provide an improved method as above, which results in a rugged and durable product not susceptible to failure; to provide a novel and improved process for producing a photo album sheet or similar structure, which is especially convenient to use, that produces a product having increased accessibility of the pictures or contents, and which presents a large expanse while folding into a compact shape and size for storage; to provide an improved process for producing an album as above, which is simple, reliable, and of low manufacturing cost.

Other objects and advantages will hereinafter appear.

In the drawings:

FIG. 1 is a diagrammatic perspective view of one apparatus by means of which the improved method of the invention is carried out.

FIG. 2 is a transverse section through filler sheet stock, taken on the line 2—2 of FIG. 1.

FIG. 3 is a perspective view of a photo album constructed in accordance with the invention.

Considering first FIG. 3, there is illustrated a photo album or similar structure, having a plurality of filler sheets or leaves 10, 12. FIG. 2 illustrates in cross section the formation of the filler leaves 10, 12, each such filler leaf comprising a plurality of filler sheets 14, 16, 18 and 20 which may be advantageously constituted of stiff paper. The filler sheets 14, 16, 18 and 20 are disposed in pockets formed by transparent upper and lower plastic protective sheets 22, 24 respectively, the said protective sheets being joined together by heat seals (bar seals) 26 disposed in straight lines which extend along the adjoining side edges of the filler sheets 14, 16, 18 and 20. Also, the upper and lower transparent cover sheets 22, 24 are joined together along other straight lines extending at their outer or remote edges, by heat seals 28 and also by adjoining "tear seals" 30, such joining being also effected by a heat sealing procedure and being located only at the remote opposite edges of the assemblage of cover sheets and filler sheets.

As seen in FIG. 2, the seals 28 and 30 not only secure together the cover sheets 22, 24 but the seals 30 also virtually sever or cut through the said cover sheets, thereby to enable edge scrap portions of the unfinished assemblage to be torn away, leaving straight, nicely finished sealed edges.

The filler leaves 10, 12 are seen to be perforated along one side edge each, to accommodate looseleaf hinges 32, 34 as shown in FIG. 3.

In accordance with the present invention a novel and improved method is provided for producing the filler leaves 10, 12 in high production quantities, and in a most economical fashion while still resulting in a rugged and durable, especially useful product. The method of the invention is illustrated in FIG. 1. As shown here, the upper transparent plastic cover sheet 22 is supplied from a continuous roll of plastic sheet stock 38, and the lower cover sheet 24 is supplied from a second continuous roll of plastic sheet stock 40. In FIG. 1, the cover sheets 22, 24 are actually in the form of continuous webs which are supplied from the rolls 38, 40 and are brought in superposed relation, as illustrated.

Adjoining the rolls 38, 40 are rolls 42, 44, 46 and 48 of relatively stiff paper sheet stock or equivalent material, said rolls supplying the filler sheets or webs 14, 16, 18 and 20 respectively. The webs 14, 16, 18 and 20 are interposed between the webs 22, 24 in edge-to-edge spaced relation with each other, and the outer edges of the outer webs 14, 20 are spaced a short distance within the side edges of the cover webs 22, 24.

All of the webs 14, 16, 18, 20, 22 and 24 are simultaneously fed in superposed relation from the continuous supply rolls to a sealing station which is designated generally by the numeral 50. It will be noted that at the said sealing station 50, the webs 14, 16, 18, and 20 are in edge-to-edge relation but spaced apart, and also spaced from the remote edges of the cover webs 22, 24.

The sealing station 50 comprises a platen or bed 52 which may be constituted of a metal plate 54 and a plastic plate or buffer sheet 56 of phenolic or other composition.

The sealing station 50 further comprises a metal die 58 having a plurality of depending brass electrodes 60 disposed in parallel relation and having a respective spacing which is slightly greater than the width of any one of the filler sheets or webs 14, 16, 18 and 20.

The die 58 is shown diagrammatically as being connected by a wire 62 to a source of radio frequency power 64 which is also connected by a wire 66 with the metal plate 54 of the platen 52. Such connections are diagrammatic, and actually the electrical connections which they represent are made by metal ribbons having a large surface area.

The assemblage of webs 14, 16, 18, 20, 22 and 24 passes over and is supported by the platen 52, and for the purpose of heat-sealing the cover sheets 22, 24 to each other in the manner indicated in FIG. 2, the die 58 is lowered so that the die strips 60 engage the upper cover sheet or web 22 along straight lines which are disposed beyond the edges of the paper webs 14, 16, 18 and 20. With the die 58 lowered and in the said position pressing against the assemblage of the webs, the RF power when applied to the die will effect a heating of the web assemblage and cause the webs to be heat-sealed in the manner shown in FIG. 2, the outermost seals also constituting tear seals by which the scrap portions of the assemblage may be readily torn off to leave smooth sealed edges of the composite web structure.

After the heat sealing at the station 50, the die 58 is raised, and the web assemblage is advanced or indexed from right to left to present new portions of the assemblage at the sealing station 50. The heat sealing operation as described is then repeated on the new portions of the assemblage. Thus, by a single operation of the die 58, five straight edges along the paper webs 14, 16, 18 and 20 are simultaneously heat-sealed and tear-sealed.

As each new portion of the assemblage is presented at the sealing station 50 to be heat-sealed, the previous heat-sealed portion is available to be severed transversely from the assemblage. The severed heat-sealed portions may then be further cut into specific lengths, and one edge of each specific length may be perforated to accommodate one or the other of the loose-leaf hinges 32, 34. A number of such filler leaves is carried by each of the looseleaf hinges 32, 34 as illustrated in FIG. 3.

It will now be understood that the filler leaves 10, 12 may be very economically and quickly produced by a high production method in accordance with the showing of FIG. 1. Not only is the cost of the filler leaves kept to a minimum figure, but the filler leaves are found to be especially durable and sturdy, particularly when the transparent cover sheets 22, 24 are made of a vinyl composition.

In accordance with the invention the filler leaves 10, 12 as thus made are incorporated in a novel album structure, such structure comprising a relatively stiff back panel 70 provided along its opposite parallel side edges with the looseleaf hinges 32, 34. The filler leaves 10, 12 have a width which is slightly less than half the width of the back panel 70, and the said filler leaves are divided into two sets which are secured respectively to the side edges of the back panel by the looseleaf hinges. There is also provided a relatively rigid inner cover panel 74 which is of lesser width than the back panel and which is hingedly secured to the right side edge of the back panel, as by the looseleaf hinge 34. Also, there is provided an outer cover panel 76 which is substantially of the same width as the back panel 70 and is hingedly secured to the other or left side edge of the back panel, as by a usual type of fold hinge 78.

It will now be seen that with the cover panels 74, 76 in the open position as illustrated, and with the sets of filler leaves 10, 12 in their open positions, a large expanse is had comprising the equivalent of four widths of a filler leaf. If each filler leaf comprises four pockets or envelopes, each holding a picture, then a combined expanse may represent a total of sixteen pictures as seen in FIG. 3. It is to be noted that each picture will be separately and individually accessible, by such arrangement. However, with such large expanse, the album still folds into a standard book-size, as by first folding inward the inner cover panel 74, closing the set of pages 12 and thereafter folding inward the outer cover panel 76, closing the remaining set of filler leaves 10. The effective width of the album is accordingly that of the back panel 70, when the album is closed. Yet, when the album is open there is had an effective width of twice this, over which pictures may be displayed.

It will be understood, referring to FIG. 2, that pictures such as snapshots and the like may be interposed between the filler sheets and the cover sheets so that each pocket or envelope may contain two snapshots, visible from opposite sides of the filler leaf. Thus, each filler leaf 10, 12 may carry a total of eight snapshots, four being visible at each side thereof.

It will now be understood from the foregoing that I have provided an improved process for making sheets or filler leaves for photo albums and the like, producing a highly desirable end product which is rugged and durable, not likely to be easily torn or to malfunction, and yet which will be produced easily and quickly, and with the greatest possible economy. By providing the cover panels 70, 74 and 76 with a vinyl covering, an extremely durable album results, and one which may have an especially attractive, leatherlike finish.

Variations and modifications may be made within the scope of the claims, and portions of the improvement may be used without others.

I claim:

1. The method of making filler leaves for a photo album or the like, which comprises the steps of simultaneously feeding in superposed relation and from continuous supply rolls two webs of heat-sealable plastic sheet material, simultaneously feeding a plurality of spaced narrower filler webs of sheet material in edge-to-edge relation and from continuous supply rolls, with and between said plastic webs and in spaced relation to the side edges of said plastic webs, halting the assemblage of said webs at a sealing station, heat sealing the plastic webs to each other along straight lines which extend along all side edges of said filler webs while the assemblage is at said sealing station, thereafter advancing said assemblage of webs including said heat sealed portion to bring new portions of the assemblage to the heat-sealing station, and repeating the heat-sealing operation on said new portions of the assemblage.

2. The method of claim 1, and including the additional step of severing the first-mentioned heat-sealed portion of the assemblage from the remainder of the assemblage after the said repeating of the heat-sealing operation.

3. The method of claim 2, and including the additional steps of cutting the severed assemblage portion into specific lengths, perforating edge portions of said specific lengths along the cut edges thereof, and assembling said perforated lengths on a looseleaf hinge.

4. The method of claim 3, wherein the side edges of the web assemblage are tear-sealed, to enable edge scrap portions to be readily torn off.

5. The method of claim 3, wherein the heat-sealing operations on all portions of the plastic webs at the sealing station are done simultaneously.

No references cited.

DOUGLAS J. DRUMMOND, *Primary Examiner.*